United States Patent [19]

Csatlos

[11] 3,883,387
[45] May 13, 1975

[54] BUILDING DRUM SHAPING SEGMENT ASSEMBLY

[76] Inventor: Geza M. Csatlos, P.O. Box 1411, Wadsworth, Ohio 44309

[22] Filed: Aug. 28, 1973

[21] Appl. No.: 392,334

[52] U.S. Cl. ............. 156/415; 156/132; 156/133; 156/401
[51] Int. Cl... B29h 17/12; B29h 17/16; B29h 17/26
[58] Field of Search ......... 156/110, 123, 128, 128 I, 156/131–133, 394, 398–403, 414–420

[56] References Cited
UNITED STATES PATENTS

| 3,489,634 | 1/1970 | Pizzo et al. | 156/398 |
| 3,684,621 | 8/1972 | Frazier et al. | 156/401 |
| 3,698,987 | 10/1972 | Woodhall et al. | 156/401 |
| 3,767,509 | 10/1973 | Gazuit | 156/415 |

FOREIGN PATENTS OR APPLICATIONS

| 1,172,319 | 11/1969 | United Kingdom | 156/414 |

Primary Examiner—Clifton B. Cosby
Assistant Examiner—John E. Kittle

[57] ABSTRACT

Apparatus for the building of tires, bands, or laminate structures; a tire building drum having a radially expansible medial portion and contractible end portions. An improved shaping segment assembly for defining the circumferential extent of the building surface on the radially expansible medial portion.

10 Claims, 6 Drawing Figures

3,883,387

BUILDING DRUM SHAPING SEGMENT ASSEMBLY

BACKGROUND OF THE INVENTION

The present invention relates to apparatus for the building of tires, bands, or laminate structures.

More particularly, the invention relates to a drum carried on a building machine used to build tires.

Specifically, the invention relates to a cylindrical drum having a radially expansible medial portion and contractible or longitudinally movable end or carrier portions for the building of radial tires.

The prior art relating to radial tire building drums goes back many years and is attributable to many sources. Describing to the extent practical the state of the prior art known to the applicant requires a selection process. The following statements of representative prior art are presented in the style: Patent No., date of filing, assignor; followed by a summary of relevant disclosure.

United Kingdom Patent No. 1,172,319, March/1966, The Dunlop Company Ltd. A building machine pedestal (44) rotatably mounts a tubular drum shaft (38) coaxially housing a double thread drive shaft (40). The drive shaft allows symmetrical axial approach and separation of nuts (39) and thereby causes symmetrical radial movement of operating links (23) via annular sleeves (37) slidable axially along the drum shaft. The operating links carry support segments (10,11) for an annular diaphragm or sleeve (14) covering the radially expansible medial portion of the drum.

U.S. Pat. No. 3,490,980, July/1966, National-Standard Company. Carrier portions (12,13) mount inflatable bag means or annular bladders (16,17). Pivoted segment means (7,8) carried by cylindrical casings (23,24) overlie the bladders and locate tire beads (20, 21) at opposite ends of the main drum (6). Thereafter, the segment means are moved axially toward and over the main drum to assist the bladders in wrapping the tire beads.

U.S. Pat. No. 3,536,566, June/1967, National-Standard Company. A drum (15) has a radially expansible medial portion (17), and collapsing end portions (20) and a sleeve or cover (102). Rotation of a double thread drive shaft (23) actuates ball nuts (116) carrying guide blocks (113) mounted for axial sliding movement in slots (115) formed in a tubular drum shaft (19). The guide blocks provide for predetermined axial movement of end head components (22) which carry a force transmitting means (40) pivotally connected to the medial portion and each collapsing end portion.

United Kingdom Patent No. 1,253,869, June/1968, National-Standard Company. A drum has a medial portion (15) and end assemblies (16). The medial portion is radially expanded by sets of screw means (27) housed in a hub member (22) on the drum shaft (24) having gears (40) meshing with gears (36,37) on the drive shaft (35). The end assemblies are slidably mounted on the drum shaft, carry annular turn-up bladders (63), provide for the support of tire bead shoulder forming means (65) including pivoted members (69) beneath an annular sleeve or cover (90) and actuated by a bladder (80), and carry annular supporting members (92) extending axially toward the medial portion. An annular member (100) mounted on the drum shaft carries telescopic gap shield plates (106) between the annular supporting members and the medial portion.

U.S. Pat. No. 3,582,435, December/1968, National-Standard Company. In this patent, reference is made to the parent application (Ser. No. 736,363) of United Kingdom Patent No. 1,253,869. A drum has a medial portion (15) and end assemblies (16). The medial portion is radially expanded by the mechanism of U.S. Pat. No. 3,536,566 actuating levers or control links (40). The gap shield means of U.S. Patent No. 1,253,869 are now disclosed, as indicated at 97, as part of the end assemblies. The drum has a carrier assembly (120) movable coaxially of each end assembly with push means (121) for the turn-up bladders (63).

U.S. Pat. No. 3,718,520, July/1969, Uniroyal Englebert France S.A. This patent discloses a radially expansible and axially contractable tire building drum (D) with two end sections (D-1 and D-2) and a middle section (D-3). The end sections include rigid, circumferentially aligned, cylindrical sector-shaped elements mounting the ends of a diaphragm or sleeve which is radially expanded by the application of pneumatic pressure. The drum end sections are linked by an internal lever system. Mechanical camming means operatively engage the sector-shaped segments to clamp the carcass ply material around the beads.

U.S. Pat. No. 3,637,450, January/1970, National-Standard Company. This patent discloses a drum having a radially expansible medial portion (4), such as disclosed in U.S. Pat. No. 3,536,566, with an actuating linkage as disclosed in United Kingdom Patent No. 1,172,319.

U.S. Pat. No. 3,684,621, June/1970, National-Standard Company. This patent discloses an intermediate drum assembly (4) or medial portion, referenced as shown in U.S. Pat. No. 3,637,450. Forming tire bead shoulders at opposite ends of the intermediate drum assembly, disclosed in U.S. Pat. No. 3,490,980, and improved by the tire bead shoulder forming means (65) of United Kingdom Patent No. 1,253,869, is stated as further improved by "an arrangement of parts (elements 63–161), for forming the tire bead shoulders lying within a predetermined infinite range of spaced apart relationships with respect to each other for a given predetermined tire bead diameter."

German Patent Publication 2,138,933, August/1970, (U.S. parent application Ser. No. 61,226), Intercole Automation, Inc. The drum (D) has a medial portion radially expanded by racks (40), pinions (52), and a ring gear (60) actuated by rotation of the drum shaft (14). Rotation of a double thread drive shaft (148) causes symmetrical axial movement of end portions (L,L') mounting the sleeve (130) covering the medial portion.

U.S. Pat. No. 3,721,600, August/1970, NRM Corporation. Discloses a drum usable for conventional tire or radial tire building. The initial radial expansion of the drum, during bead setting, is achieved by radial racks engaged by pinions rotatable together by an axially movable annular rack. The patent also makes reference to a ply turn-up and sidewall applying mechanism (4) and suitable mechanism as disclosed in U.S. Pat. No. 3,560,301, (May,1967), for full expansion of the drum medial portion (2).

U.S. Pat. No. 3,698,987, December/1970, The Goodyear Tire & Rubber Company. The drum (10) has a radially expansible medial portion, a pair of segment assemblies (42,43), and a pair of auxiliary drums (79) carrying an annular turn-up bladder (80). The medial portion is a series of axially extending cover plates (84) radially expanded by individual pistons (88) housed in a hub member (87) on the drum shaft (11). The segment assemblies have housings (44) carried by annular hubs (30,31) slidably mounted on the drum shaft (11) and axially movable by rotation of a double thread shaft (15). The annular hubs each have a pressure chamber (34) housing a piston-cam (35–36) element for selective contact with a series of radially movable lifter rods (46) carried within the housing bores (45). Each lifter rod mounts a segment (48) with a surface (50) for supporting fabric plies. Each segment is biased inwardly by an O-ring (52). A pneumatically inflated sleeve (55) overlying the cover plates (84) is clamped at the outer end of each segment assembly by rings (56,57) fastened to a housing. Each clamp ring has a series of movable bead gripping members or fingers (59) carried within slots (58) and radially movable by selective contact with the piston-cam element. Each bead finger has a surface (74) for contacting fabric plies. Each bead finger is biased inwardly by O-ring (65).

German Patent Publication No. 2,219,957, May/1971, (U.S. parent application Ser. No. 143,846), NRM Corporation. The drum medial portion has sector segments (91) carried by pantographic actuating links (85,86). The axially outer ends of the links are carried by nuts (79,80) carried on a double thread shaft (110). The medial portion is first raised to the bead set position by rotation of the shaft. Thereafter, the drum medial portion is fully radially expanded by the mechanism of U.K. Patent No. 1,172,319, actuating the links by sleeves (68,69) on a double thread shaft (65) within the drum shaft (8).

An apparatus or tire building drum, incorporating the subject matter of the invention, is less complex to build, is easier to operate, and is more readily maintained, than the building drums of the known prior art.

SUMMARY OF THE INVENTION

It is an object of the present invention to provide improved apparatus for the building of tires, bands, or laminate structures.

It is a further object to provide an improved assembly for the radially expansible medial portion of a tire building drum having building surfaces provided by the medial portion and contractible or longitudinally movable end or carrier portions.

Still further, it is an object to provide an improved shaping segment assembly to provide support under the areas of a tire being built on the medial portion of a drum and for defining maximum circumferential extent of the building surface provided by the radially expansible medial portion.

These and other objecs of the present invention, and the advantages thereof, will be apparent in view of the Detailed Description of the Invention as set forth below.

In general, a shaping segment assembly according to the invention is carried by a shaping mechanism used to radially expand the medial portion of the building drum having building surfaces provided by the medial portion and contractible end portions.

The medial portion is overlaid by a cylindrical sleeve. The medial and end portions are mounted around a drum shaft. The shaping mechanism includues opposed axially movable actuator sleeves mounted around the drum shaft. Each actuator sleeve carries the axially outer end of one of a pair of a series of control links positioned radially of the drum shaft. The axially inner end of each pair of control links is pivotally connected to a shaping segment carrier.

The shaping segment assembly according to the invention is characterized in that, there are an alternating series of fixed and floating segments underlying and supporting the cylindrical sleeve as a building surface. Each fixed segment is carried by one of a series of the carriers pivotally connected to a pair of control links. Each floating segment is connected adjacent the ends thereof to a fixed segment by a pair of continuous chains with pantographic links.

Each segment is further characterized in having a zigzag or interconnected and reversed chevron configuration, with both an axial and a radial extent sufficient, to provide support for the cylindrical sleeve under the tread and crown areas of a tire being built on the drum.

DETAILED DESCRIPTION OF THE INVENTION

Figure 1:
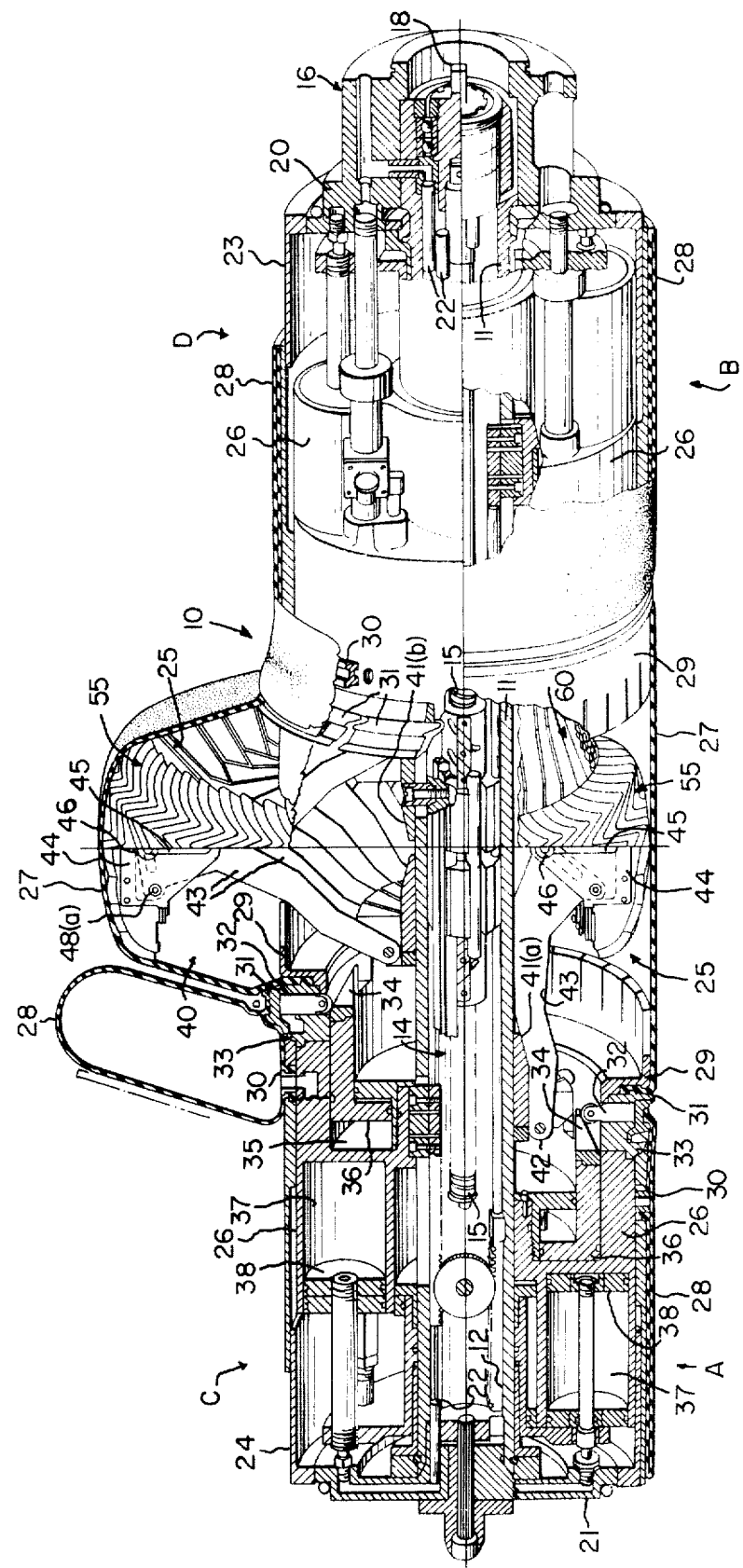
FIG. 1 is a composite of four perspective views showing the tire building drum incorporating the subject matter of the invention; the lower quadrants A and B showing the building drum end or carrier portions in the axially outer position and the medial portion in the retracted position; the upper quadrants C and D showing the building drum with the medial portion in the radially expanded position and the end or carrier portions in the axially inner positions.

In general, and referring to the views of FIG. 1, the subject matter of the invention is intended to be used as an operating component of an apparatus or tire building drum 10 having as the primary axial component an elongated drive shaft 11 with an axial bore 12. A drive screw 14 with double and opposite hand thread portions 15 extend through the shaft bore 12. The inboard end of the drive shaft 11 is received within a drive flange 16. The flange 16 is adapted to be connected to a drive element on the main housing or head stock of a conventional tire building machine. The inboard end of the drive screw 14 has a quill 18 adapted to be connected to a drive element on the main housing or head stock of a tire building machine.

The shaft 11 carries an inboard manifold 20, for the supply of fluid operating pressure from the building machine to the drum 10, preferably located within the drive flange 16. The shaft 11 also carries an outboard manifold 21, for the distribution of fluid pressure from a series of conduits 22 extending through the shaft bore 12. The shaft 11 also carries an inboard end cover 23, axially outwardly of the manifold 20, and an outboard end cover 24, axially inwardly of the manifold 21.

The drum building surfaces are provided by a radially expansible medial portion 25, and contractible or longitudinally movable end or carrier portions 26. The medial portion 25 is overlaid by a generally cylindrical diaphragm or sleeve 27. Each carrier portion 26 mounts an inflatable bag means or annular bladder 28. The sleeve 27 and bladders 28 are composed of any suitable elastomeric material.

Each carrier 26 mounts an annular plate 29 for clamping an end of the sleeve 27, and an annular ring 30 for clamping of a bladder 28.

Between the plate 29 and ring 30, each carrier 26 mounts a circumferentially continuous series of segmented bead clamps 31, individual actuators 32 for each bead clamp segment 31, an annular bead clamp guide ring 33 receiving the actuators 32, and a bead clamp actuator cam ring 34.

Each carrier 26 has a pressure chamber 35 housing a piston 36 for actuating the bead clamp actuator cam ring 34. Each carrier 26 also has pressure chambers 37 housing pistons 38 for moving the carrier axially along the shaft 12.

A shaping segment assembly according to the invention may be carried by a shaping mechanism referred to generally by the numeral 40. The mechanism 40 is incorporated in the building drum 10 as an operating component between the carrier portions 26 and under the sleeve 27.

Figure 2:
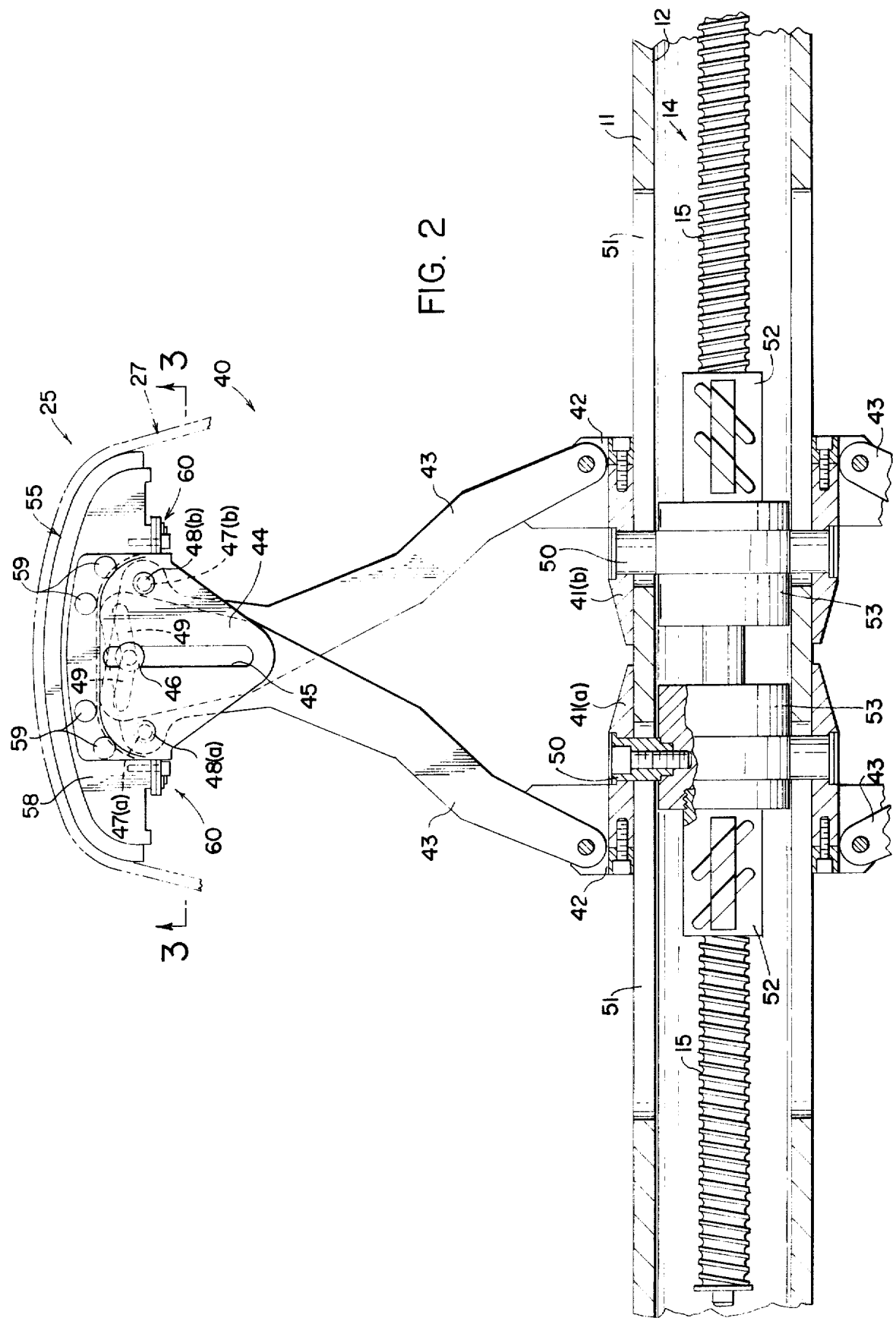
FIG. 2 is a fragmentary view in section of the shaping segment assembly according to the invention in the radially expanded condition.

Referring to FIG. 2, the mechanism 40 has dual and opposed, outboard and inboard, actuator sleeves 41(a) and 41(b) slidably mounted around the drum shaft 11. Each sleeve 41 has a carrier ring portion 42 for mounting the axially outer end of a series of control links 43. The axially inner end of each control link is pivotally connected to a shaping segment carrier which may be a pair of matching tie links 44.

Each tie link 44 has a medial elongated slot 45 oriented transverse the axis of the drum shaft 11 for receiving a control pin 46. Each tie link 44 has two connection points, 47(a) and 47(b), equally spaced on opposite sides of the slot 45, for the control links 43. The radially outer portion of each control link 43 carried by an actuator sleeve 41(a) crosses over the slot 45 and is connected, as by a pin 48(a), at the tie link connection point 47(a). Similarly, each control link 43 carried by an actuator sleeve 41(b) is connected, as by a pin 48(b), at the tie link connection point 47(b). Therefore, the tie link slot 45 is directed radially with respect to the pivotal connection between the tie link 44 and each pair of control links 43. The radially outer portion of each control link 43 has a slot 49 oriented to traverse the slot 45 and to receive a control pin 46. The control pin 46 when mutually captivated at the intersection point of the slots 45 and 49 will maintain the orientation of the tie link slot 45 transverse the axis of the drum shaft 11, when the actuator sleeves 41 are moved relatively axially inwardly on the drum shaft 11 to radially expand the cylindrical sleeve 27.

Each thread portion 15 of the drive screw 14 is connected to an actuator sleeve 41 as by trunnion pins 50 extending radially inwardly through a longitudinal slot 51 in the drum shaft 11. Within the shaft bore 12, a conventional ball nut 52 is mounted on each thread portion 15. Each ball nut 42 carries a receiver member 53 for a trunnion path pin 50.

The shaping mechanism 40 disclosed herein, including elements 41 through 49 thereof, is disclosed an representative of a shaping mechanism used to radially expand the medial portion 25 of the building drum 10 having building surfaces provided by the medial portion and contractible end portions 26.

Other shaping mechanisms having an actuating linkage could be used for radial expansion of the medial portion 25 and adapted for carrying of the components of the shaping segment assembly according to the invention, referred to generally by the numeral 55. See, for example, U.S. Pat. No. 3,637,450, January/1972, referenced above in the BACKGROUND OF THE INVENTION.

Figure 3:
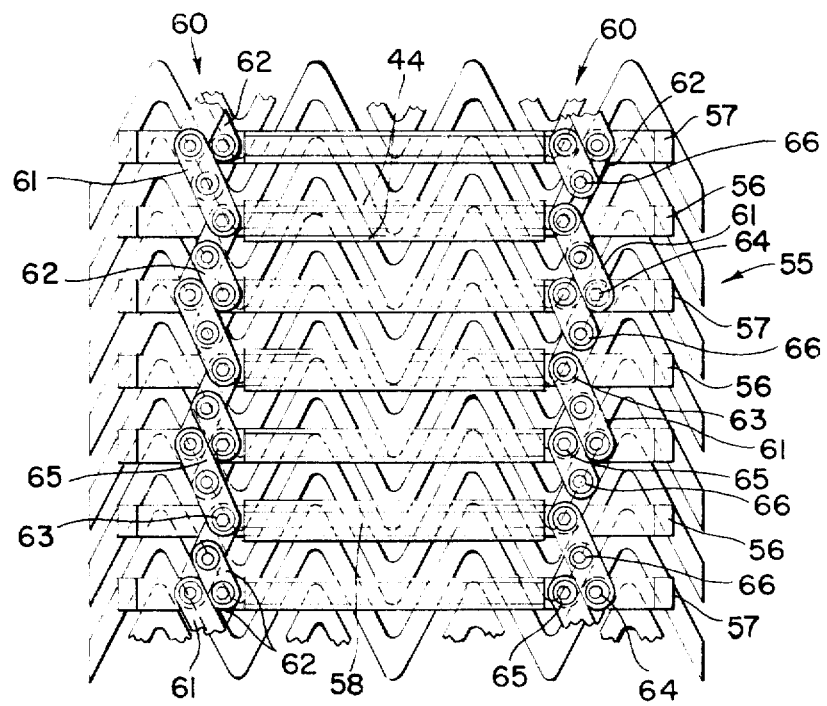
FIG. 3 is a fragmentary view of a shaping segment assembly according to the invention, taken substantially on line 3—3 of FIG. 2.
Figure 4:
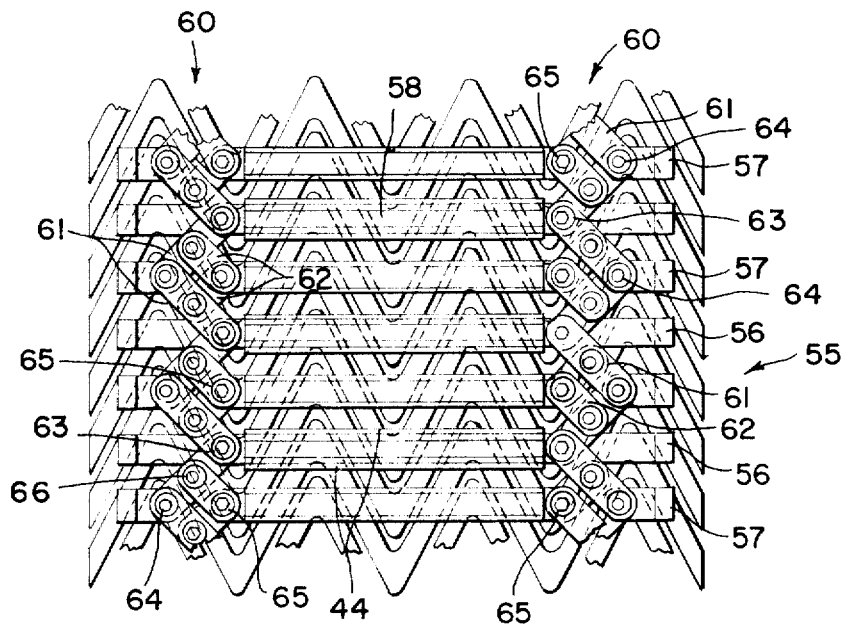
FIg. 4 is a view similar to FIG. 3, but showing the shaping segment assembly in the retracted condition.

Referring to FIGS. 3 and 4, a shaping segment assembly 55 includes an alternating series of fixed segments 56 and floating segments 57.

Each segment 56 is securely attached, by a radially outwardly directed flange 58 and fastening means 59, to a pair of tie links 44. Each segment 57 is connected adjacent the ends thereof to a fixed segment 56 by a pair of continuous chains with pantographic links, referred to generally by the numeral 60.

Figure 5:
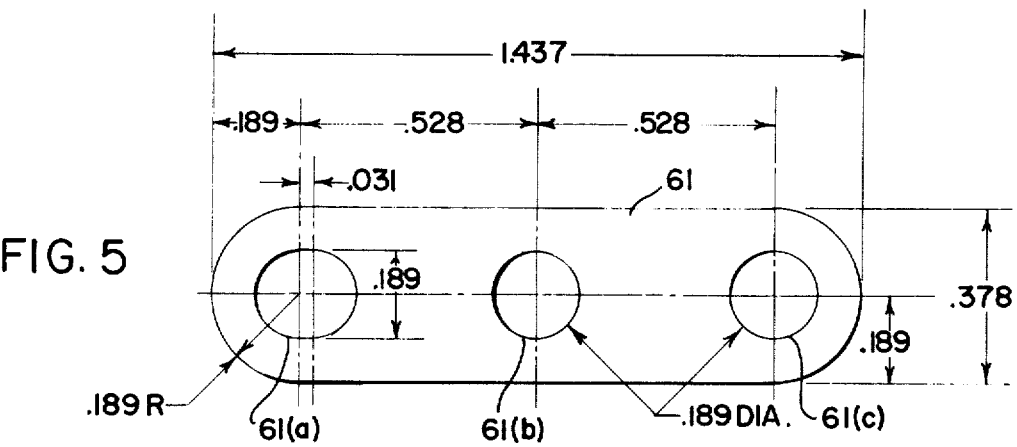
FIG. 5 is a dimensioned plan view of a long chain link.
Figure 6:
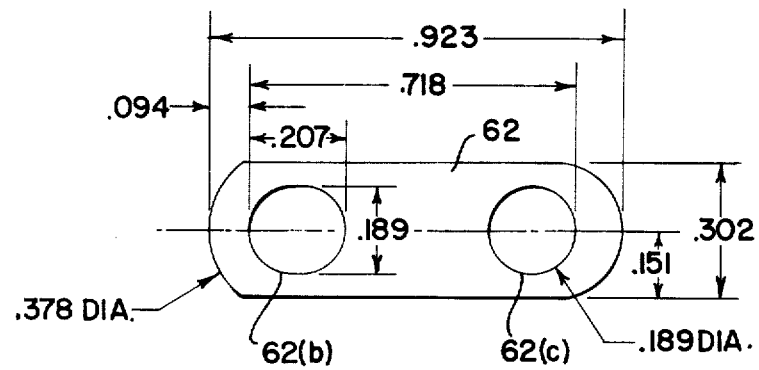
FIG. 6 is a dimensioned plan view of a short chain link.

Each pantographic chain 60 has sets of long links 61 and sets of short links 62. Representative dimensions for long links 61 and short links 62, which may be used in the shaping segment assembly 55 of a tire building drum 10 intended for the building of a 15 inches dia. passenger size tire, are set forth in FIGS. 5 and 6.

Each long link 61 has three connection points, 61(a), 61(b) and 61(c). End point 61(a) is preferably elongate, medial point 61(b) is circular, and end point 61(c) is circular. Each short link 62 has two connection points, 62(b) and 62(c). End point 62(b) is preferably elongate, and end point 62(c) is circular.

Referring to FIG. 3, two representative long links 61 are connected, as by a threaded link bolt 63 inserted through points 61(a), to the underside of one fixed segment 56. The two representative links 61 are each connected, as by a link pin or rivet 64 inserted through a point 61(c), to adjacent long links 61.

Two representative short links 62 are connected, as by a threaded link bolt 65 inserted through points 62(b), to the underside of one floating segment 57. The two representative short links 62 are individually connected, as by a link pin or rivet 66 inserted through a point 62(c), to the connection point 61(b) on two long links 61.

Referring still to FIG. 3, the interfitting segments 56 and 57 each have a zigzag configuration, or interconnected and reversed chevron configuration, with both an axial and radial extent to provide support for the cylindrical sleeve 27 under the tread and crown areas of a tire being built on the drum 10.

The pantographic link chain 60 maintains the dimensional stability of the segments 56 and 57 during all movement of the shaping assembly 55 by the shaping mechanism 40, and at all times during the tire building operations on the medial portion 25 of the drum 10.

What is claimed is:

1. A shaping segment assembly carried by a shaping mechanism used to radially expand the medial portion of a building drum having building surfaces provided by said medial portion said contractible end portions, said medial portion being overlaid by a cylindrical sleeve, said medial and end portions being mounted around a drum shaft, said shaping mechanism including opposed axially movable actuator sleeves mounted around said drum shaft, each said actuator sleeve carrying the axially outer end of one of a pair of a series of control links positioned radially around said drum shaft, the axially inner end of each pair of control links being pivotally connected to a shaping segment carrier, characterized in that, said assembly has an alternating series of fixed and floating segments underlying and supporting said cylindrical sleeve as a building surface, each said fixed segment being carried by one of the series of said carriers pivotally connected to a pair of said control links, each said floating segment being connected adjacent the ends thereof to a fixed segment by a pair of continuous chains with pantographic links.

2. A shaping segment assembly according to claim 1, further characterized in that, each segment has a zigzag configuration, with both an axial and radial extent sufficient, to provide support for the cylindrical sleeve under the areas of a structure being built on said medial portion of the drum.

3. A shaping segment assembly according to claim 1, further characterized in that, each segment has an interconnected and reversed chevron configuration, with both an axial and radial extent sufficient, to provide support for the cylindrical sleeve under the areas of a structure being built on said medial portion of the drum.

4. A building drum having the shaping segment assembly of claim 1, wherein the shaping mechanism therefore is, further characterized in that, said shaping segment carrier is also a tie link, and, each said tie link has a medial slot therein transverse the axis of said drum shaft to receive a control pin inserted therethrough, and an axially inner end of each control link has a slot therein oriented to traverse said slot in a shaping segment and to receive said control pin, said pin being mutually captivated by said slots equidistant from the pivotal connections of said control links to a tie link when said actuator sleeves are moved relatively axially inwardly on said drum shaft to radially expand said medial portion of the drum.

5. A shaping segment assembly carried by a shaping mechanism used to radially expand the medial portion of a building drum mounted on a drum shaft, said shaping mechanism including opposed axially movable actuator sleeves mounted around said drum shaft, each said actuator sleeve carrying the axially outer end of one of a pair of a series of control links positioned radially around said drum shaft, the axially inner end of each pair of control links being pivotally connected to a shaping segment carrier, characterized in that, said assembly has an alternating series of fixed and floating segments underlying and supporting a cylindrical sleeve as a building surface, each said fixed segment being carried by one of the series of said carriers pivotally connected to a pair of said control links, each said floating segment being connected adjacent the ends thereof by links to the adjacent fixed segment on each side thereof.

6. In a tire building drum having a drum shaft, a shaping segment assembly for providing the tire building support comprising, a plurality of generally axially extending segments of substantial radial dimension and closely spaced around the circumference of said drum, said segments having a radially retracted and a radially expanded condition, each said segment having a zigzag configuration and nesting with adjacent segments in both retracted and expanded conditions to provide a substantially continuous supporting drum surface, and means for moving said segments radially to circumferentially expand and retract said assembly.

7. A shaping segment assembly as in claim 6 further comprising, a generally axially directed flange mounted on the radially inner surface of each segment, the apices of each segment overlying the flanges of adjacent segments when said assembly is expanded.

8. A shaping segment assembly as in claim 6 further comprising, links interconnecting adjacent segments.

9. A shaping segment assembly as in claim 8 in which said links are pivoted on adjacent assemblies by pins passing through holes in said links, at least one hole in each link being elongated.

10. A shaping segment as in claim 6 in which said projecting means includes a series of control links each supporting a segment carrier and spaced around said shaft, each of the alternate segments being engaged by a segment carrier, and links connecting the remaining adjacent segments to said alternate segments.

* * * * *